(No Model.)

A. L. CUSHMAN.
MECHANICAL MOVEMENT.

No. 328,014. Patented Oct. 13, 1885.

Witnesses:
Charles Quaid
Chas. H. Richardson.

Inventor:
Abe L. Cushman

UNITED STATES PATENT OFFICE.

ABE L. CUSHMAN, OF CONCORD, NEW HAMPSHIRE.

MECHANICAL MOVEMENT.

SPECIFICATION forming part of Letters Patent No. 328,014, dated October 13, 1885.

Application filed March 2, 1885. Serial No. 157,487. (No model.)

*To all whom it may concern:*

Be it known that I, ABE L. CUSHMAN, a citizen of the United States, residing at Concord, in the county of Merrimac and State of New Hampshire, have invented a new and useful Mechanical Motion, of which the following is a specification.

The invention relates to mechanical motion in which gears act in connection with gears.

The object of my invention is, first, to get a powerful motion; second, to get from high to low speed. I attain these objects by mechanism illustrated in the accompanying drawings, in which—

Figure 1:
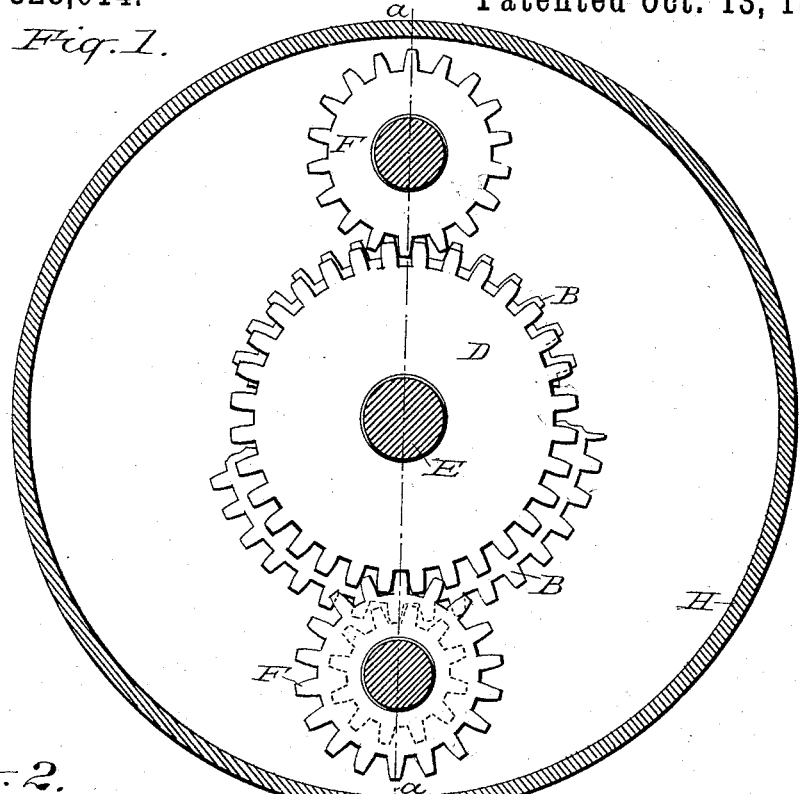
Figure 2:
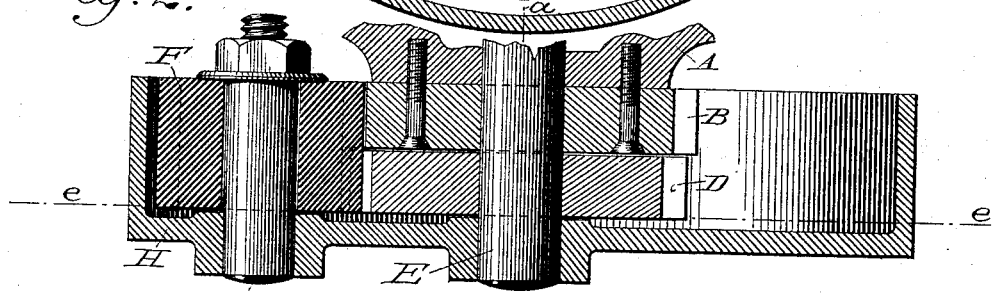
Figure 3:
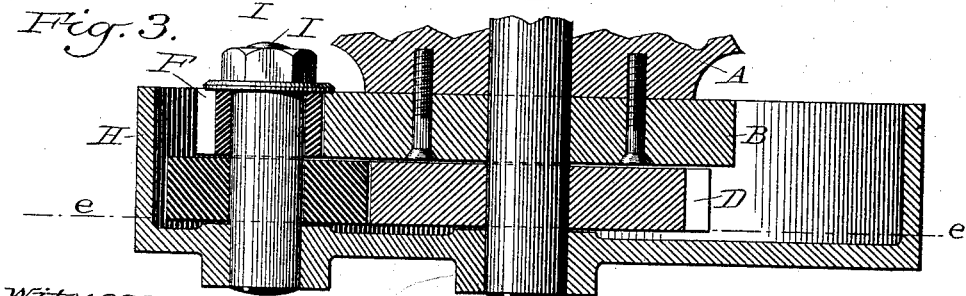

Figure 1 is a sectional view on line c c, showing the gears in two different forms. Fig. 2 is a sectional view on line a a, showing the motion proper as it would appear if gear B were continued around the same as D, and the lower gear, B and F, removed. Fig. 3 is a sectional view of Fig. 1 as it would appear if gear F were continued around and gear B and F removed, showing the motion in a different form.

Similar letters refer to similar parts throughout the several views.

This motion can be applied to any machine or object requiring positive or powerful motion, in this case A being the object, and to the same is secured a gear, B, in this case by screws i i, the former having thirty-one teeth. And passing through the same is an arbor, E, for the purpose of receiving gear D, (see Fig. 2,) which has thirty teeth. And running close to gear D, and secured to the said shaft E, and running loose on the same shaft, is a pulley, H, having a boss or lug, through which passes a shaft, I. And on the same shaft is a gear, F, meshing into gears B and D, so that when the said pulley H makes one revolution it will turn gear D one tooth. Therefore the pulley H would have to make thirty revolutions to make gear D turn once around. The pulley H can be driven by a belt or gear, or any means causing it to rotate around the said shaft E. The gears B and D would not have to be thirty and thirty-one teeth, respectively, but can be any number of teeth to get the required power or speed, as shown in Fig. 3, where it will be seen that the gears B and D vary more than one tooth. In this case the gear B has six more teeth than gear D, so that every time the pulley H rotates around the said shaft E, gear D will turn six teeth. Also, the gears B and D would not have to be of the same pitch, but could be of different pitches and still have the same effect, if the gear F were made to conform to the former, which may be accomplished by making one-half of gear F one pitch, the other half the other pitch. This may be done by securing two gears of different pitch together; or they can be cast in one, as desired; and yet the same result can be reached by having two internal gears of a different number of teeth, and another gear rotating around inside, so as to gain a certain number of teeth at every revolution.

The gears could be held in position by any means suitable for that purpose.

I am aware that differential gearing is no new thing.

I claim—

Gear or gears F, rotating around gears B and D, for the purpose of giving motion to the latter, all substantially as set forth and described.

ABE L. CUSHMAN.

Witnesses:
C. C. GOODWIN,
HIRAM J. CARTER.